Nov. 9, 1948.                    F. CLOETE                    2,453,684
                           HYDRO-KINETIC COUPLING
Filed Sept. 17, 1945                                   4 Sheets-Sheet 1
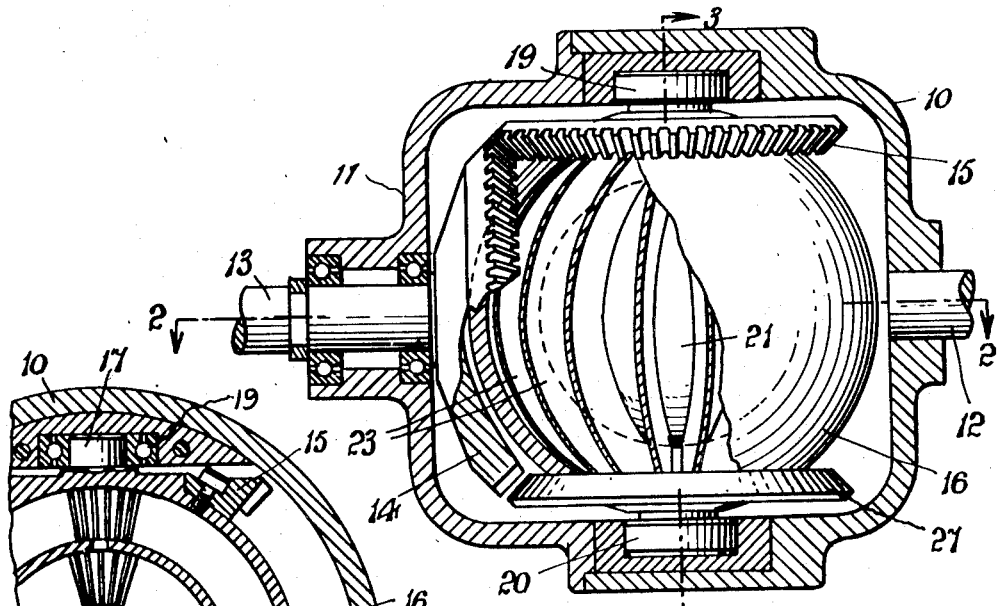
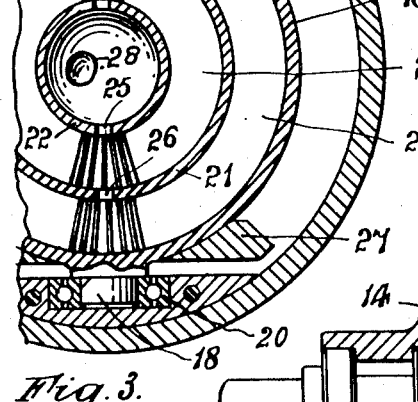
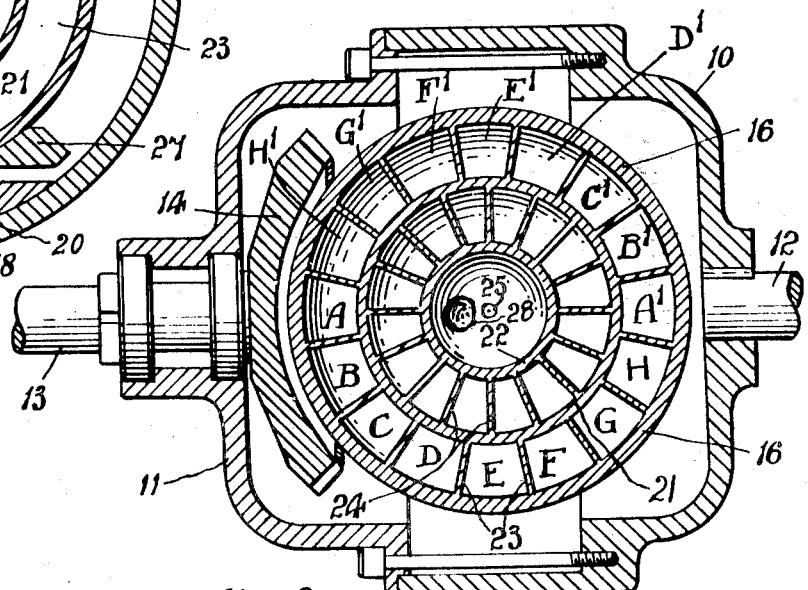
Fig. 1.
Fig. 3.
Fig. 2.
INVENTOR.
Floris Cloete Nov. 9, 1948. F. CLOETE 2,453,684
HYDRO-KINETIC COUPLING
Filed Sept. 17, 1945 4 Sheets-Sheet 2

INVENTOR.
Floris Cloete

Nov. 9, 1948.        F. CLOETE        2,453,684
HYDRO-KINETIC COUPLING
Filed Sept. 17, 1945                 4 Sheets-Sheet 3

INVENTOR.
Florio Cloete

Nov. 9, 1948.  F. CLOETE  2,453,684
HYDRO-KINETIC COUPLING
Filed Sept. 17, 1945  4 Sheets-Sheet 4
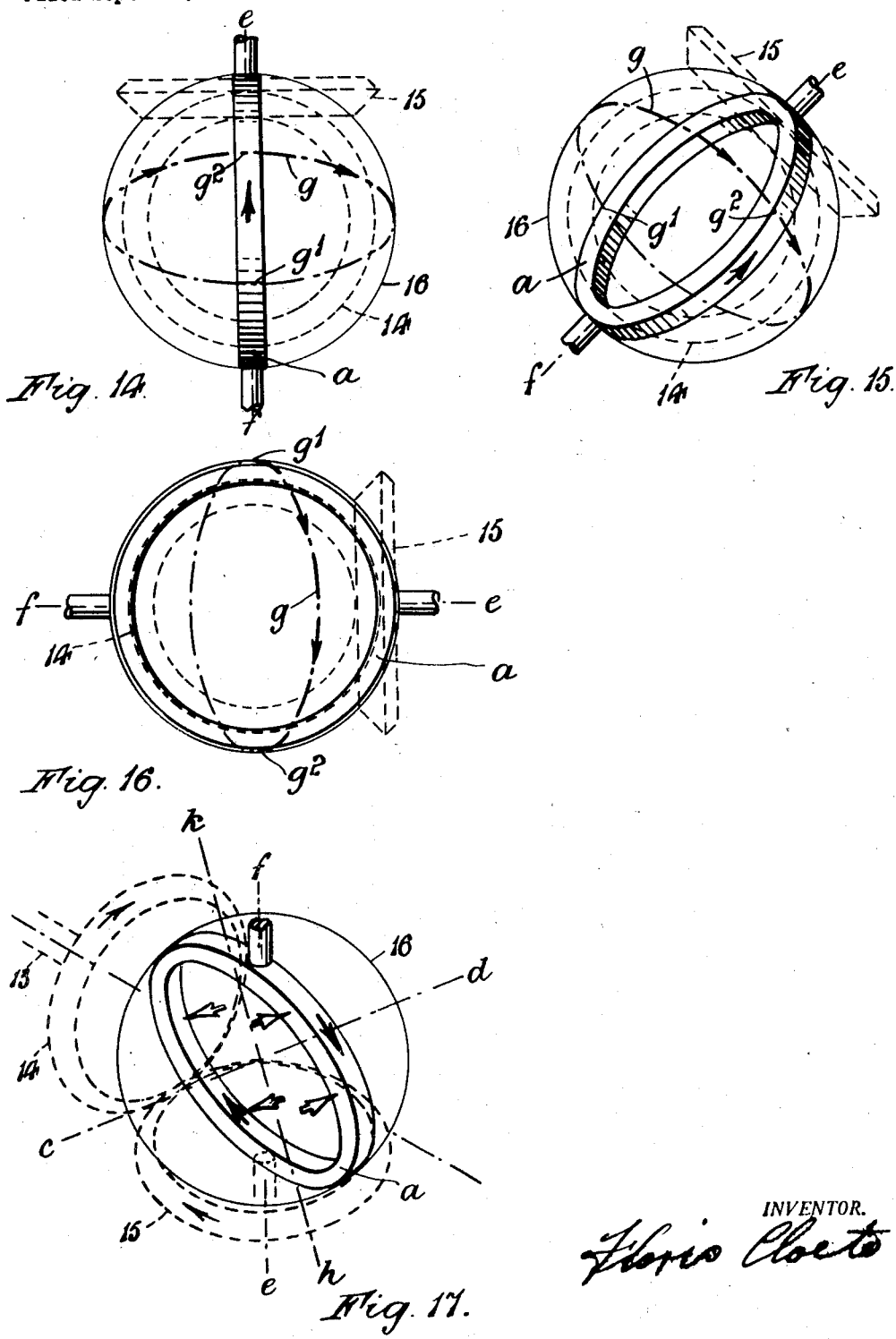
INVENTOR.
Florio Cloete Patented Nov. 9, 1948

2,453,684

UNITED STATES PATENT OFFICE 2,453,684

HYDROKINETIC COUPLING

Floris Cloete, Detroit, Mich.

Application September 17, 1945, Serial No. 616,773

4 Claims. (Cl. 74—259)

This invention has for its object to provide a hydro-kinetic power transmitting coupling for use between driving and driven shafts which will permit infinite variation in the rotational speed ratio between said shafts, and at the same time transmit a torque whose magnitude depends on the rotational speed difference between the said shafts. Stated another way, a coupling which will automatically vary the value of the transmitted torque with the infinite variable rotational speed difference between a driving shaft and a driven shaft.

A second object is to provide a hydro-kinetic power-transmitting coupling in which the magnitude of the transmitted torque per given rotational speed difference between the driving and driven shafts, will increase when the rotational speed range of said shafts is increased. Stated another way, a coupling in which for low speeds, a large speed difference between the driving and driven shafts will cause a small torque to be transmitted, whereas for high speeds, a small speed difference between the driving and driven shafts will cause a large torque to be transmitted.

A third object is to provide a device whereby the rotation of a driving shaft may be converted into a static torque on a driven shaft which is not rotating. Said static torque varying in magnitude with the speed at which the said driving shaft rotates.

A fourth object is to provide a simple power transmitting hydro-kinetic coupling, employing a minimum of separate parts, in which the active fluid will be confined to one single completely sealed hydraulic chamber, free from the inclusion therein of any relatively moving parts.

In principle the said invention provides for power transmitting means between driving and driven shafts, a series of arcuate fluid enclosing channels arranged along meridian planes of the same sphere and mutually connected at the polar areas. Said series of channels being rotatable about their common polar axis, and geared to a driven shaft in such a manner that the direction of the said common polar axis may be rotated by a driving shaft, through a plane transverse to the axis of the said driving and driven shafts, whereupon the gearing at the same time will rotate the said channels about their common polar axis when the driven shaft is rotating slower than the driving shaft.

The simultaneous rotation of the said channels about the two different axes mentioned above, bringing into effect relative motion and forces between the fluid and the walls of the channels, which will result in a driving torque on the driven shaft.

The application of the invention in practice obviously extends to wherever flexibility in power transmission between driving and driven shafts is desirable.

In carrying the said invention into effect, I may provide within a two-piece hollow casing, keyed at one end to a driving shaft and at the other end journalled for rotation around a driven shaft, a rotary hollow spherical member journalled in said casing for rotation about a polar axis transverse to and crossing the axis of the said driving and driven shafts. The said member being characterized by its housing which contains a series of fluid filled, walled channels lying along meridian planes and mutually connected at the polar areas, of said member. Power transmitting connection between the said member and the driven shaft being effected through suitable gearing. All of which is more particularly described by way of example in and by the following description of the accompanying drawings in which:

Figure 1 is a sectional elevation of the hydrokinetic power transmitting coupling embodying the said invention, parts of the device being broken away to disclose the arcuate walled channels within the sphere.

Figure 2 is a horizontal section of the same, taken on a plane indicated by the line 2—2 in Figure 1.

Figure 3 is a vertical cross section of the same, taken on a plane indicated by the line 3—3 in Figure 1.

Figure 5:
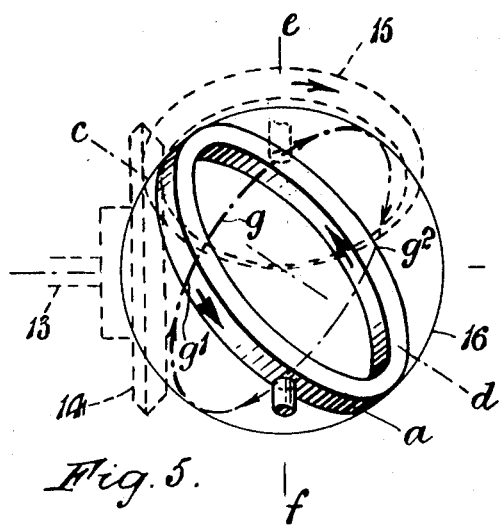

Figures 4 to 17 inclusive are schematic diagrams presented for the purpose of graphically illustrating the principles on which the device operates.

Similar characters of reference indicate similar parts in the different figures of the drawings.

Referring first to Figures 1, 2 and 3 of the drawings, a casing 10, 11 is shown with a driving shaft 12 keyed to the element 10 of the said casing and a driven shaft 13 journalled for rotation in the element 11 of said casing.

Within the casing and mounted on the inner end of the driven shaft 13 is a bevel gear 14 which meshes with a second bevel gear 15, mounted on a hollow spherical member 16 which is in turn provided with polar stub shafts 17 and 18 journalled for rotation in bearings 19 and 20 respectively in the wall of the said casing.

Thus the said spherical member is rotatable with the casing about the axis of shafts 12 and 13, and is also rotatable about the axis of the polar stub shafts 17 and 18 to such extent as may result from the rolling of the bevel gear 15 on the driven bevel gear 14, according to whether the said gear 14 is held against rotation or is permitted by the mechanism it drives to rotate at any speed up to that of the casing.

Obviously, if the said driven bevel gear is permitted to attain the same speed as the casing, the gear 15 will remain stationary in mesh therewith, and there will then be no rotation of the spherical member about the axis of the polar stub shafts 17 and 18.

Within the spherical member 16 are smaller spheres 21 and 22 one within the other, and between the two outermost spheres 16 and 21 are a series of radially disposed walls 23 extending along meridian planes, and thus forming arcuate channels in opposite pairs such as A—A¹, B—B¹, C—C¹, D—D¹, E—E¹, F—F¹, G—G¹ and H—H¹ Figure 2, all passing through the polar areas. The walls 23, are however, interrupted at the polar areas as shown in Figure 3 to permit mutual fluid communication between the different channels. Similarly arranged walls 24 are also provided between the walls of spheres 21 and 22, forming similar channels to those described above.

The spherical device is intended to be filled with a suitable fluid and small openings 25 and 26, preferably situated on the polar axis, are provided to afford fluid communication between the interiors of the several spheres 16, 21 and 22, for the purpose of equalizing pressures due to expansion of the fluid under high temperatures. The outermost sphere 16 being made strong enough to withstand such pressures without bursting.

Further, the spheres may be filled with fluid at the time of manufacture, and sealed permanently.

27 is simply a balance weight carried by the sphere 16 to counter-balance the weight of the gear 15, it being necessary to provide for dynamic balance in the moving parts of the structure.

The space within the innermost sphere 22 may be utilized to house any suitable compressible capsule 28 for the purpose of taking up expansion of the fluid.

For an understanding of the principles on which the device operates in accomplishing the previously mentioned objectives, it will be helpful referring to Figures 4 to 17 inclusive, of which Figures 4, 5, 6 and 7 are schematic diagrams showing an opposite pair of channels such as A—A¹ Figure 2, as a single channel a, in consecutive positions in space as it will appear to a stationary observer during the travel of the gear 15 around the gear 14, which is considered for the purpose of this explanation to be held stationary and free from rotation by the resistance of the mechanism to which it may be connected. The travel of the gear 15 is of course the result of the rotation of the casing 10, 11 by the shaft 12 (which casing and driving shaft are not shown in the schematic figures in order to avoid undue confusion of lines). For the sake of clarity and simplicity of illustration the channel a is indicated as being in the form of a continuous ring of square cross section which should be considered as being hollow and filled with fluid.

Figure 8:
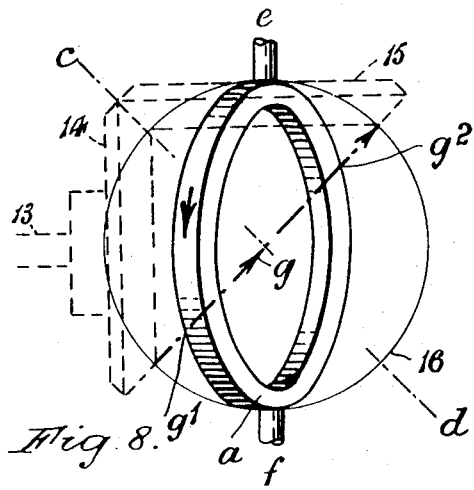
Figure 9:
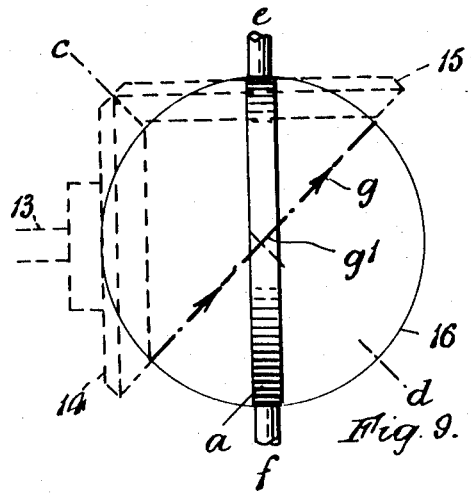
Figure 10:
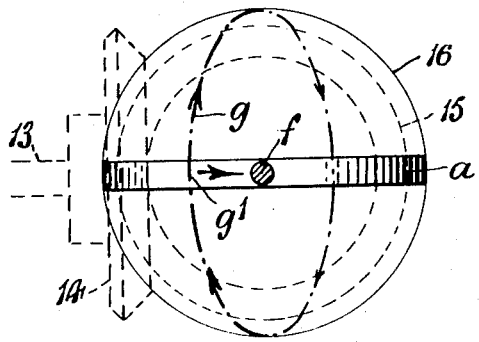
Figure 11:
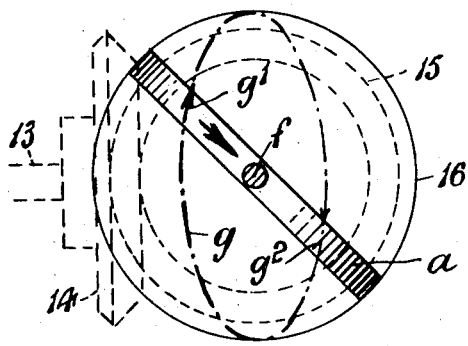
Figure 13:
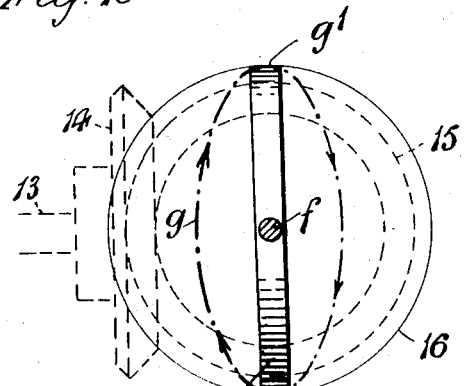
Figure 12:
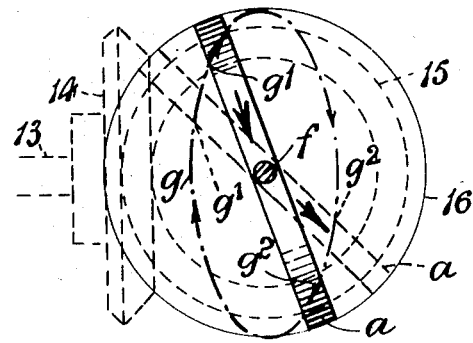

Figures 8 and 9 are similar to Figures 4, 5, 6 and 7 with the exception that they show consecutive positions of a as presented to a moving observer continuously viewing the sphere in a direction at right angles to the plane which contain both the polar axis e—f and the axis of the shafts 12 and 13.

Figures 10 to 13 inclusive are similar diagrams, showing consecutive positions of a as it will appear to a moving observer, continuously viewing the sphere in a direction along the polar axis e—f and towards the face of the gear 15.

Figures 14, 15 and 16 are similar diagrams, showing consecutive positions of a as it will appear to a stationary observer, viewing the sphere in a direction along the axis of shafts 12 and 13, and towards the face of gear 14.

Figure 4:
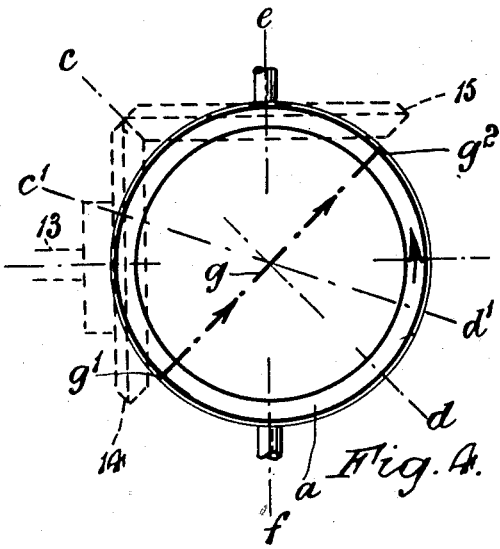
Figure 7:
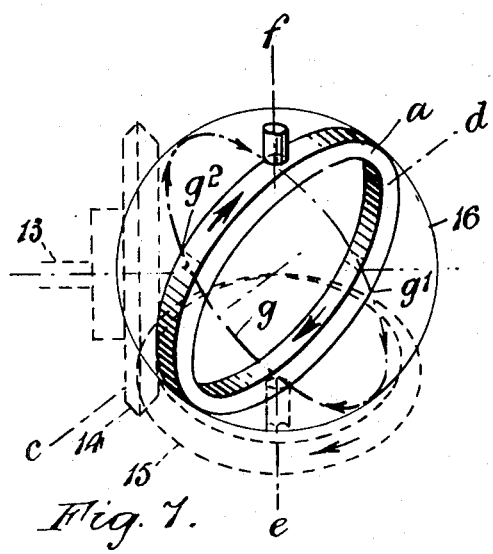
Figure 6:
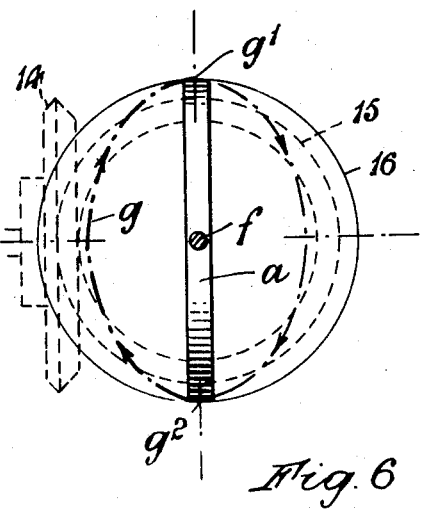

Figure 17 is a perspective schematic diagram with the channel a shown in the position which it occupies in Figure 4.

Now, from these schematic diagrams showing consecutive positions of a single fluid filled channel as it will appear to different observers during the operation of the device, the truth of the following statements will be self-explanatory.

When the sphere is subjected to the compound rotation about both its polar axis e—f and the axis of shafts 12 and 13, every point on its surface will at any given instant of time rotate momentarily about an instantaneous resultant axis c—d which will pass through the center of the sphere and the pitch point of the gears 14 and 15, provided the gear 14 is not rotating.

The points of intersection of the surface of the sphere and the instantaneous resultant axis c—d may be considered as being the instantaneous poles of the sphere in its compound rotation, and the great circle g, whose plane is perpendicular to the instantaneous resultant axis c—d, as the instantaneous equator.

Obviously, the instantaneous resultant tangential velocity of any point on the surface of the sphere, at any given instant of time, will be a function of the instantaneous radius at which it rotates about c—d at the said given instant of time. Or, in other words, a function of its perpendicular distance from c—d at the given instant. From this follows that at a given instant of time, those points on the sphere which fall on c—d will have zero tangential velocity, whereas the points falling on g will have a maximum instantaneous tangential velocity, and of course, intermediate points on the sphere will have corresponding intermediate instantaneous tangential velocities.

Naturally, the instantaneous planes in which points on the sphere momentarily rotate about c—d, such as the plane of the instantaneous equator g, will be perpendicular to c—d and of course parallel to each other.

Now, with the preceding paragraphs in mind, and reference to Figures 4 to 13 inclusive, which show consecutive positions of a as it will appear to different observers, the following two important facts will become apparent: first, at any given instant of time, some points on a recede from c—d and approach g, whereas other points approach c—d and recede from g, with the consequence that the instantaneous resultant tangential velocity of some points are being accelerated, whereas that of other points are being retarded. Said accelerations and retardations being of course in directions along the instantaneous planes of rotation such as that of g, and perpendicular to corresponding instantaneous radii of rotation.

Second, the directions in which points on a are being accelerated and retarded as explained above, will at any given instant of time, make a multitude of different angles other than 90° with the plane of $a$.

Now, from the foregoing it follows that points on $a$ are being accelerated and retarded in directions which are oblique to the plane of $a$, with the consequence that, due to inertia, the fluid in $a$ tends to flow along the plane of $a$ which is so inclined to the directions in which points on it are being accelerated and retarded.

Obviously, at any given instant of time, the direction in which the fluid will tend to flow along those portions of $a$ which are being accelerated, is opposite to the direction in which it will tend to flow along the other portions which are being retarded, consequently it will flow in the direction of the greater force, and at a rate which is a function of the difference between these two forces.

In the general position shown in Figure 4, the portions of $a$ which are being accelerated are obviously greater than the portions which are being retarded, consequently the fluid will flow along $a$ in the direction shown by the heavy arrows along its surface.

Again, when $a$ is in the position shown in Figure 9, the portions which are accelerated are obviously equal to the portions which are retarded, consequently the forces are balanced, and any flow of the fluid while $a$ is in this position will be due to kinetic energy induced into it while $a$ moved through positions intermediate to the positions shown in Figure 4 and Figure 9.

It is further obvious that as the rotation of $a$ continues from the position shown in Figure 9, the portions which are being retarded gradually become bigger than the portions which are being accelerated with the consequence that the fluid now flows relative to $a$ in a reverse direction from that previously described.

It will thus be noticed that the fluid flows relative to $a$, in a direction towards the gear 15, at varying rates for different positions of $a$ in one hemi-sphere, whereas it flows away from 15 at similar varying rates in the other hemi-sphere.

Referring to Figures 14, 15 and 16, it will be clearly seen how the direction of the instantaneous planes of rotation, such as that of the instantaneous equator $g$, continuously change in space, and it is important to bear this fact in mind when making calculations involving the flow of the fluid relative to $a$.

Now, when the fluid flows along $a$ as explained before, during the operation of the device, it is evident that particles of fluid which have high instantaneous tangential velocities around $c$—$d$, are being transferred to points in $a$ which have lower instantaneous tangential velocities around $c$—$d$, whereas other particles of fluid which have low instantaneous tangential velocities are being transferred to points in $a$ which have higher instantaneous tangential velocities.

From this follows that, due to inertia the fluid will exert pressures or forces against the walls of $a$, and the directions of these pressures or forces which act perpendicular to the plane of $a$, will be in the different quadrants, as shown by the open arrows in the perspective diagram, Figure 17. From these open arrows it will be noticed that the direction of the above mentioned forces in the part of $a$ which is on one side of the instantaneous equator $g$ is opposite to the direction of the said forces in the other part of $a$ which is on the other side of $g$, with the consequence that these forces act like a couple, tending to rotate the plane of $a$ around an axis $h$—$k$ which lie along the plane of $g$ and passes through the center of the sphere. More specifically, this axis $h$—$k$, which may be called the instantaneous torque axis, will always be at right angles to the instantaneous resultant axis of rotation $c$—$d$, and pass through the center of the sphere and points $g^1$, $g^2$ where $g$ and the plane of $a$ intersect.

Now, for all positions of $a$, the forces acting around the instantaneous torque axis $h$—$k$, will have one component which directly tends to assist the rotation of the driving shaft, while another component, with the meshing gear teeth as reaction fulcrum, counter-acts the tendency of the first mentioned component to assist the rotation of the driving shaft, and when the driven gear 14 is not rotating, the moments of these two mutually opposing force components are equal, and will have no effect on the free rotation of the driving shaft, but a static torque whose magnitude depends on the rotational speed of the said driving shaft, will be applied to the stationary driven gear 14 whose meshing teeth take the reaction between the said force components. Further, the said static torque will be in the same direction as the rotation of the driving shaft.

However, when the driven gear 14 does rotate due to the above mentioned torque applied to it, the instantaneous resultant axis of rotation $c$—$d$, to which the instantaneous torque axis $h$—$k$ is always perpendicular, will no longer be co-linear with the pitch line which passes through the pitch point of gears 14 and 15, instead it will be intermediate between the said pitch line and the axis of the driving and driven shafts, such as shown by $c^1$—$d^1$ in Figure 4, and the angle which it makes with the said pitch line will be a function of the rotational speed ratio between the driving and driven shafts. As a consequence of this, the moments of the previously explained force components which act around the meshing gear teeth as reaction fulcrum, are no longer balanced, and an opposing torque results on the rotation of the driving shaft. More specifically, as the rotational speed of the driven gear approaches that of the driving shaft, the moment of the force component which tends to assist the rotation of the driving shaft, decreases, whereas the moment of the other force component which opposes the rotation of the said driving shaft, increases, until finally when the driven shaft rotates at the same rate as the driving shaft, the first mentioned moment will be zero while the magnitude of the second will be such that the opposing torque which it imposes on the rotation of the driving shaft, is equal to the torque applied to the driven shaft.

As the alternating kinetic energy of the fluid particles in $a$ which cause the tranmission of torque from the driving to the driven shaft, is a function of the squares of their velocities, it follows that the magnitude of the transmitted torque per given rotational speed difference between the said shafts will increase when the rotational speed range is increased.

Finally, the multitude of mutually connected, fluid filled, walled channels such as $A$—$A^1$, $B$—$B^1$, $C$—$C^1$, $D$—$D^1$, $E$—$E^1$, $F$—$F^1$, $G$—$G^1$ and $H$—$H^1$ shown in Figure 2 will all combine and assist each other in producing the same effects as that described for the single channel $a$.

The advantages of this device lie in the simple and efficient utilization of the laws of inertia for the purpose of transmitting a shock-free torque between a driving shaft and a driven shaft, by means of a series of walled, fluid filled channels combined into a single hydraulic inertia member operating in conjunction with a suitable differential transmission system.

Mechanical advantages provided by using the said single hydraulic inertia member in conjunction with a suitable differential transmission system, lie in the compactness and small amount of relatively moving parts required to transmit a large and practically non-pulsating torque between a driving shaft and a driven shaft.

Hydraulic advantages provided by the novel means of permanently and totally confining the active fluid inside a single hydraulic inertia member, is apparent from the complete absence of seals or stuffing boxes which may cause leakage and require maintenance.

Furthermore, since the active fluid is permanently and totally confined inside a single hydraulic inertia member, there is no sudden interchange of fluid between fast and slow moving members, consequently the changes in the rate of flow of the fluid in the channels take place gradually, and turbulent effects are reduced to a minimum with high efficiency and absence of excessive heat as a result.

What I claim is:

1. In a variable torque transmission mechanism between a driving shaft and a driven shaft, a casing rigid with the driving shaft and journaled for rotation around the driven shaft extending into one end thereof, fluid controlled means inside the said casing for varying the torque imposed on the driven shaft coincident with the rotational speed of the driving shaft, said means including a hollow spherical hydraulic member enclosing rigidly a series of walled fluid filled arcuate channels arranged along meridian planes around the polar axis of the sphere with a common connecting chamber at each pole to provide a passage for free fluid communication between the different channels, two opposed polar stub shafts rigid with the said spherical hydraulic member and journaled for rotation in bearings rigid with the said casing about a polar axis transverse to the axis of the said driving shaft, a beveled planet gear secured to one of the said stub shafts for rotation therewith, a beveled sun gear meshing with the said beveled planet gear and secured to the inner end of the said driven shaft for rotation therewith, substantially as described.

2. A variable torque transmission comprising a casing, a driving shaft keyed to said casing, a driven shaft journaled through the casing and terminating in a bevel gear, fluid confining means having stub shafts journaled in the casing, a bevel gear mounted on said fluid confining means with its axis coincident with the axis of the stub shafts, said fluid confining means being divided into a plurality of interconnected channels such that biaxial rotation of said means causes a flow of fluid from one point therein to another.

3. A variable torque transmission comprising a casing, a driving shaft keyed to said casing, a driven shaft journaled through the casing and terminating in a bevel gear, a hollow spherical hydraulic member having opposed stub shafts coincident with its axis, said stub shafts being journaled in the external casing transversely to the axis of the driving shaft, a bevel gear mounted on the spherical member with its axis coincident with the axis of the stub shafts and meshing with the bevel gear of the driven shaft, a series of walled fluid-filled arcuate channels arranged along meridian planes around the polar axis of the sphere and interconnected at the poles.

4. A variable torque transmission comprising a casing, a driving shaft keyed to said casing, a hollow spherical hydraulic member, opposed stub shafts rigid with the hydraulic member and coincident with its axis, said stub shafts journaled in the external casing transversely of the axis of the driving shaft, a bevel gear mounted on the spherical member with its axis coincident with the axis of stub shafts and meshing with the bevel gear of the driven shaft, a series of walled fluid-filled arcuate channels arranged along meridian planes around the polar axis of the sphere and interconnected by a common chamber at each pole.

FLORIS CLOETE.

REFERENCES CITED

The following references are of record in the file of this patent:

UNITED STATES PATENTS

| Number | Name | Date |
| --- | --- | --- |
| 1,360,216 | Hunt | Nov. 23, 1920 |
| 1,758,252 | Gardner | May 13, 1930 |
| 1,914,865 | Rath | June 20, 1933 |

FOREIGN PATENTS

| Number | Country | Date |
| --- | --- | --- |
| 102,854 | Australia | Jan. 13, 1938 |
| 176,325 | Great Britain | July 27, 1922 |
| 397,841 | Germany | June 30, 1924 |
| 723,339 | France | Apr. 7, 1932 |